Nov. 9, 1926.  
G. R. RADLEY  
1,606,043  
ELECTRIC GENERATING PLANT OR SYSTEM  
Filed August 4, 1920

Inventor  
Guy R. Radley  
By Frank A. Hubbard  
Attorney

Patented Nov. 9, 1926.

1,606,043

UNITED STATES PATENT OFFICE.

GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRIC GENERATING PLANT OR SYSTEM.

Application filed August 4, 1920. Serial No. 401,223.

This invention relates to isolated electric generating plants or systems, and more particularly to control means therefor.

It has heretofore been proposed to provide an isolated plant for supplying electro-motive forces up to 110 volts, a generator driven by an internal combustion engine being employed to supply current for all loads and a motor supplied by a relatively low votage battery being empoyed for cranking the engine. While such systems possess obvious advantages over those limited to lower voltages or requiring batteries having a large number of cells, nevertheless, the character of the control heretofore provided has tended to subject certain of the parts to unwarranted strains and other unfavorable working conditions.

The present invention has among its objects that of providing an improved and simplified controller for obviating the foregoing disadvantages in plants of the general character aforedescribed.

Another object is that of providing for the aforedescribed and similar plants a control system wherein provision is made for starting the plant from any one of several non-adjacent stations and thereafter stopping the plant at will from any of said stations.

Various other objects and advantages will hereinafter appear.

According to the present invention it is proposed to provide an engine driven generator to supply electrical energy at suitable voltage to the load lines and to provide an additional dynamo electric machine for cranking the engine, said machine moreover to be driven by the engine, for charging said battery. The various control instrumentalities are co-ordinated to provide for energization of the dynamo electric machine to crank the engine upon closure of any of a number of conveniently located hand control switches, stopping of the engine being effected through movement of any one of said switches to a different circuit closing position. Also provision is made for starting of the engine without load upon the generator and for automatically connecting the latter to the load circuit upon attainment of a given terminal voltage less than its normal voltage.

Figure 1:
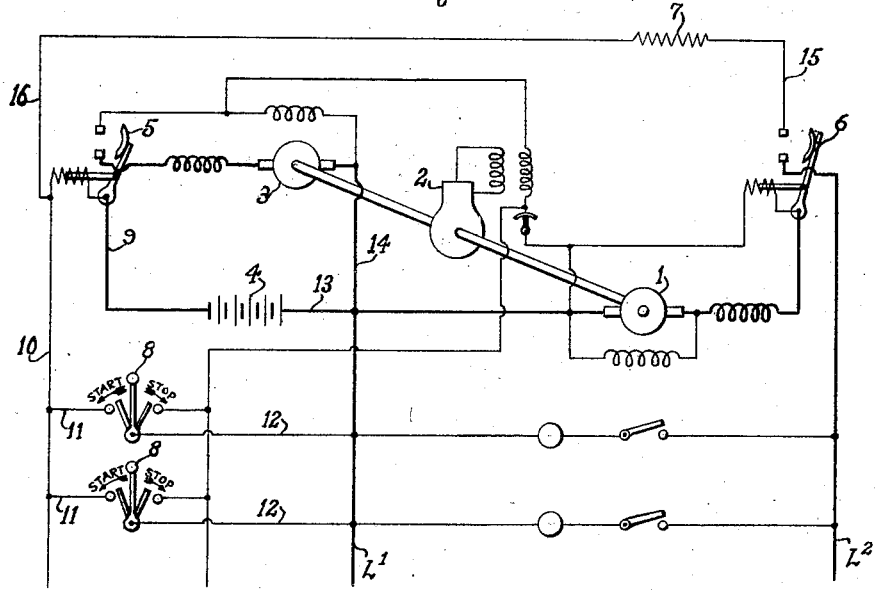
Figure 2:
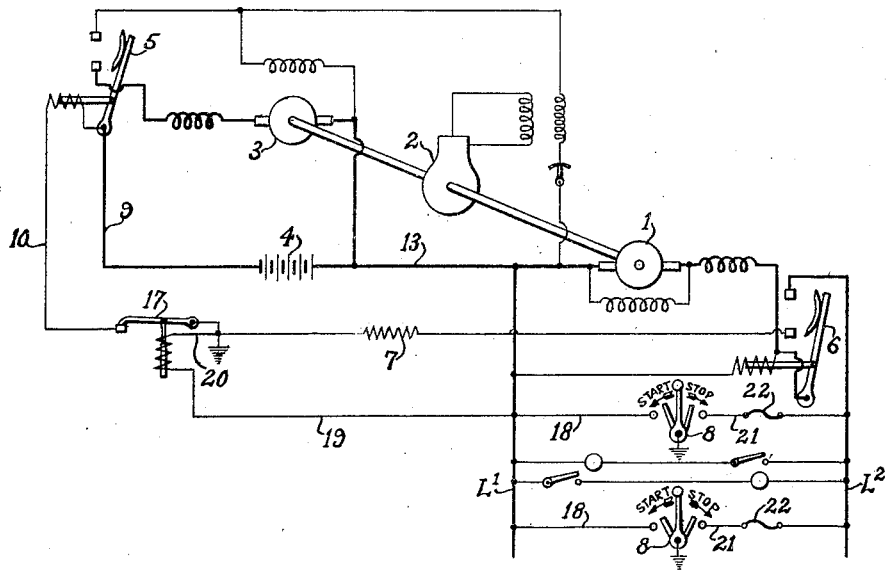

In the accompanying drawing, Figure 1, illustrates schematically and diagrammatically a preferred embodiment of the invention; while, Fig. 2 similarly illustrates a slightly modified embodiment thereof.

In the drawing is illustrated a generator 1 to be driven by an internal combustion engine 2 for supplying a load circuit indicated by lines $L^1$, $L^2$. A dynamo electric machine 3 to be supplied from a relatively low voltage battery 4 is adapted to provide for cranking the engine and also to be driven thereby for recharging said battery. An electro-responsive starting switch 5 serves to control the energizing circuit of said dynamo electric machine and also the ignition circuit of the engine, whereby said switch provides both for starting and stopping of the engine. An electro-responsive running or load switch 6 serves under given voltage conditions of the generator to connect the latter to the load circuit, the energizing circuit of the switch 5 being maintained following closure of the switch 6 by current from the generator but through a suitable resistance 7.

Both the generator 1 and the dynamo electric machine 3 are provided with series and shunt fields, the fields of the former being arranged to assist one another whereas the fields of the latter are so connected as to assist one another during operation of the machine as a motor and to oppose one another so long as said machine is driven by the engine and hence acting as a generator. Such opposition of fields insures that the aforedescribed charging of the battery 4 by said machine is effected at a relatively slow rate whereby danger of overcharging the battery is obviated.

The energizing circuit of the starting switch 5 is controllable by any one of a plurality of manual control switches 8, 8 each of said switches being preferably of single-pole double-throw normally open construction and adapted to close but a single set of its co-operating contacts at one time, the second set of connections in each of said switches being preferably arranged to effect short-circuiting of the engine ignition for stopping of the latter.

The various parts being in the relative position illustrated, movement of any one of the manual control switches 8 to the left serves to complete the energizing circuit of the starting switch 5, said circuit extending from the left hand terminal of the battery 4 by conductor 9 through the winding of said starting switch thence by conductors 10 and 11 through the manual control switch and by conductor 12, line L¹, and conductor 13 to the opposite terminal of the battery. Said starting switch thereupon closes and connects the dynamo electric machine 3 across the terminals of the battery for operation of said machine as a motor to crank the engine. The power circuit thus established extends from the left hand terminal of the battery by conductor 9 to and through the main contacts of said starting switch 5 thence through the series field and armature of said dynamo electric machine and by conductors 14 and 13 to the opposite terminal of the battery. Closure of the upper contacts of the starting switch also serves to complete the shunt field circuit of the dynamo electric machine and also to complete the engine ignition circuit both of said sets of connections being obvious.

Upon starting of the engine the generator 1 begins to build up voltage across its terminals and as soon as such voltage reaches a predetermined value preferably about one-half the normal generator voltage the coil of load switch 6 becomes energized sufficiently to effect closure of said switch, the voltage connections of said coil across said generator being obvious. Closure of said load switch serves to connect the right hand terminal of the generator with line L², the opposite terminal of the generator being as illustrated permanently connected with line L¹, whereby the generator now acts to supply the load circuit. Also closure of the upper contacts of said load switch serves to complete a maintaining circuit for the starting switch 5 through resistance 7 which serves to reduce the voltage of such circuit to a safe value, said circuit extending from the right hand terminal of the generator series field through said load switch thence by conductor 15 through said resistance 7 by conductors 16 and 10 through the winding of the starting switch thence by conductor 9 through the battery to line L¹ and thence to the left hand terminal of the generator. The voltage across this circuit, however, being greatly reduced by the resistance 7 the current through such circuit produces no appreciable effect upon either the battery or the dynamo electric machine, such current on the other hand being calculated merely to hold in the starting switch.

As soon as the lamps or other translating devices connected across the load circuit are energized, thus indicating that the load switch has closed, the manual control switch which was actuated for starting of the device may be released and permitted to return to the neutral position illustrated. The generator thereafter continues to supply electrical energy to the load circuit whereas the dynamo electric machine 3 is also driven from the engine and acts as a generator for charging the battery. Stopping of the engine may be effected by movement of any one of the manual control switches 8 to the right, such action serving to short-circuit the timer of the engine ignition whereupon the engine ceases firing, thus stopping the generator 1 and the dynamo electric machine 3 whereupon the starting and load switches become de-energized and return automatically to open position illustrated.

The foregoing construction and arrangement thus provide for remote control of the plant by means of the manual control switches 8, the aforedescribed circuit connections providing for starting of the plant by means of any one of said switches and for subsequent stopping of the plant by operation of the same switch or any other of such manual control switches, thus obviating the necessity of stopping the device by actuation of the same switch which was used for starting.

Also the aforedescribed action of the load switch 6 whereby the same is adapted to connect the generator to the load lines when the generator voltage reaches a given value less than its normal value provides for starting of the engine without load upon the generator whereby the operation of starting is greatly facilitated and also provides for connection of the translating devices to the generator before the voltage of the later attains its normal value, whereby the initial current taken by such translating devices is reduced and a further saving in energy of the starting motor effected. Said latter-mentioned feature is of special importance where the translating devices comprise metallic filament lamps which when cold are known to transmit many times the value of current which the same device requires when heated to incandescence.

The construction illustrated in Fig. 2 is in most essential respects similar to that aforedescribed, the action of the generator 1, the engine 2 and the dynamo electric machine 3 as well as the action of the starting switch 5 and load switch 6 being identical with that aforedescribed. In this instance, however, the control circuits are so designed and arranged as to provide for starting of the system upon grounding the load line L¹ and for stopping of the system upon grounding of the load line L², such arrangement merely requiring the addition of a stop relay 17 which acts to de-energize the maintaining circuit of the starting switch 5 upon such grounding of load line L².

The operation of this construction may be briefly described as follows.

Movement of any of the manual control switches 8 to the left serves to complete the energizing circuit of the starting switch, said circuit extending from the left terminal of the battery by conductor 9 through the winding of said starting switch thence by conductor 10 through the stop relay 17 to ground, thence to the ground connection of said manual control switch, by conductor 18 to line L¹ and by conductor 13 to the opposite terminal of the battery. Said switch thereupon closes connecting the dynamo electric machine 3 across the battery and also providing for energization of the shunt field of said machine and of the engine ignition circuit as in the case formerly described whereas the system thereafter functions precisely as in the former instance.

Stopping of the device is effected by moving any of the manual control switches 8 to the right and thereby energizing the opening circuit of the stop relay, said circuit extending from the left pole of the generator by conductor 13, line L¹ and conductor 19, through the winding of said relay and thence by conductor 20 to ground, thence through the central ground of such manual control switch and by conductor 21 and line L² through the load switch and thence to the right pole of the generator. Said relay thereupon responds interrupting the energizing circuit of the starting switch which likewise opens and interrupts the engine ignition circuit for effecting stopping of the device, the cranking circuit being also opened.

While the particular construction of the manual control switches serves to prevent simultaneous closure of the starting and stopping circuits from any one station, it is nevertheless possible by accidental or intentional manipulation of several stations to complete both of said circuits simultaneously and thereby creating a short across the load circuit, and to prevent damage due to such cause it is preferable to include fuses 22 at similar points in the line connections of each of said switches.

The construction shown in Fig. 2 possesses the advantage over the former construction of requiring fewer wires since in this construction assuming the use of grounds it is possible to install a control station across the load circuit at any point reached by the latter. It is also obvious that should it be desired to eliminate grounds, the construction may be modified by the use of a single small control wire connecting the various points at present illustrated as grounds, whereby the remote control features are attained by the use of but one wire in addition to the usual load wires.

On the other hand the construction illustrated in Fig. 1 requires two control wires and an additional connection between each manual control switch and line L¹, which connection may, however, be established through ground if desired. This construction obviates the use of the stop relay 17 required in the construction of Fig. 2.

What I claim as new and desire to secure by Letters Patent is:

1. A controller for electric generating systems including a load circuit, a generator to supply electrical energy thereto, an internal combustion engine to drive said generator and a starting motor for said engine, comprising a plurality of switches and circuit connections providing for starting said engine by any of said switches and stopping said engine by any of said switches independently of the others.

2. A controller for electric generating systems including a load circuit, a generator to supply electrical energy thereto, an internal combustion engine to drive said generator and a starting motor for said engine, comprising a plurality of switches and circuit connections providing for starting said motor by any of said switches or stopping said engine by any of said switches independently of the others, said circuit connections including parts of said load circuit.

3. In an electric generating system, the combination with a load circuit and a generator to supply electrical energy thereto, an internal combustion engine to drive said generator and a motor to be supplied from a battery for cranking said engine, of a starting switch to connect said motor across said battery and a plurality of control stations comprising switches and circuit connections controllable thereby to provide for starting operation of said starting switch from any one of said stations and to provide for stopping of the system from any one of said stations independently of the others.

4. In an electric generating system, the combination with a load circuit and a generator to supply electrical energy thereto, an internal combustion engine to drive said generator and a motor to be supplied from a suitable source for cranking said engine, of a starting switch to connect said motor across said source and a plurality of control stations comprising switches and circuit connections controllable thereby to provide for starting operation of said starting switch from any one of said stations and to provide for stopping of the system from any one of said stations independently of the others, said circuit connections including portions of said load circuit.

5. A controller for electric generating systems including a load circuit, a generator to supply said circuit, an engine to drive said generator and a starting motor for said engine, comprising an electro-responsive switch to control said motor for starting said engine, a plurality of switches each operable independently of all the others both to control said electro-responsive switch for starting said motor and to stop said engine and an automatic switch to disconnect said generator from said load circuit and to connect the latter to the former but only during driving of the generator by the engine.

6. A controller for electric generating systems including a load circuit, a generator to supply said circuit, an engine to drive said generator and a starting motor for said engine, comprising an electro-responsive switch to control said motor for starting said engine, a plurality of switches each operable independently of all the others both to control said electro-responsive switch for starting said motor and to stop said engine and an automatic switch to disconnect said generator from said load circuit and to connect the latter to the former under conditions of materially reduced voltage of the generator but only during driving of the generator by the engine.

7. A controller for electric generating systems including a load circuit, a generator to supply said circuit, an engine to drive said generator and a starting motor for said engine, comprising an electro-responsive switch to control said motor for starting said engine, and control means for said electro-responsive switch including a plurality of voluntary control switches each movable to distinct positions for energization and de-energization of said electro-responsive switch to start and stop the motor respectively during de-energization of the load circuit and the same switch or any other of said switches being also movable to a third position for stopping of the engine.

8. A controller for electric generating systems including a load circuit, a generator to supply said circuit, an engine to drive said generator and a starting motor for said engine, comprising an electro-responsive switch to control said motor for starting said engine, and control means for said electro-responsive switch including a plurality of voluntary control switches each movable to distinct positions for energization and de-energization of said electro-responsive switch to start and stop the motor respectively during de-energization of the load circuit and the same switch or any other of said switches being also movable to a third position for stopping of the engine, said switches having circuit connections including portions of the load circuit whereby the number of wires required to provide for full remote control of the system is minimized.

9. A controller for electric generating systems including a load circuit, a generator to supply said circuit, an engine to drive said generator and a starting motor for said engine, comprising in combination, a maximum number of three electro-responsive contactors, certain of said contactors to control the connection of the load circuit with the generator, and a plurality of voluntary control switches for other of said contactors, said switches having similar circuits each including portions of the load circuit, each of said switches being operable to provide for starting the motor and any of said switches being thereafter operable independently of the other switches to stop the engine.

10. A controller for electric generating systems including a load circuit, a generator to supply said circuit, an engine to drive said generator and a starting motor for said engine, comprising in combination, a maximum number of two electro-responsive contactors, certain of said contactors to control the connection of the load circuit with the generator, and a plurality of voluntary control switches for other of said contactors, said switches having similar circuits each including portions of the load circuit, each of said switches being operable to provide for starting the motor and any of said switches being thereafter operable to stop the engine.

11. A controller for electric generating systems including a load circuit, a generator to supply said circuit, an engine to drive said generator and a starting motor for said engine, comprising an electro-responsive switch to control said motor for starting said engine, a plurality of switches each operable independently of all the others to control said electro-responsive switch for starting said motor and for stopping said engine, and an automatic switch to disconnect said generator from said load circuit and to connect the latter to the former but only during driving of the generator by the engine.

12. A controller for electric generating systems including a load circuit, a generator to supply said circuit, an engine to drive said generator and a starting motor for said engine, comprising an electro-responsive switch to control said motor for starting said engine, a plurality of switches each operable to control said electro-responsive switch for starting said motor any one of said switches being thereafter operable independently of all the others to stop said engine, and an automatic switch to disconnect said generator from said load circuit and to connect the latter to the former under conditions of materially reduced voltage of the generator but only during driving of the generator by the engine.

13. A controller for electric generating systems including a load circuit, a generator to supply said circuit, an engine to drive said generator and a starting motor for said engine, comprising an electro-responsive switch to control said motor for starting said engine, a plurality of switches each operable independently of all the others to control said electro-responsive switch for starting said motor, another electro-responsive switch to disconnect said generator from said load circuit and to connect the latter to the former but only during driving of the generator by the engine, and co-operating means for holding said first mentioned electro-responsive switch in closed position so long as the other electro-responsive switch is in closed position, irrespective of the position of said independently operable switches.

14. In an electric generating system, the combination with a load circuit, a generator for supplying electrical energy thereto adapted to be disconnected therefrom when idle, an internal combustion engine to drive said generator and a starting motor for said engine, of an electro-responsive switch operable upon attainment of substantially half the normal voltage of said generator to connect the latter to said circuit, and means including a plurality of manually controlled switches operable independently of each other for effecting starting or stopping of said generator.

15. In an electric generating system, the combination with a load circuit, a generator for supplying electrical energy thereto adapted to be disconnected therefrom when idle, an internal combustion engine to drive said generator and a starting motor for said engine, of an electro-responsive switch operable upon attainment of substantially half the normal voltage of said generator to connect the latter to said circuit, and means including a plurality of manual control stations each comprising a double-throw switch biased to an intermediate position and movable in opposite directions for effecting starting or stopping of said generator independently of the other stations.

In witness whereof, I have hereunto subscribed my name.

GUY R. RADLEY.